Figure 1:
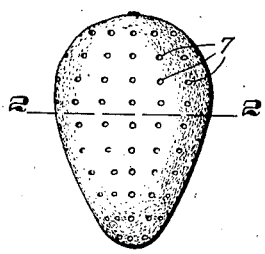

H. H. HARRISON.
DRIED FRUIT AND PROCESS OF DRYING THE SAME.
APPLICATION FILED OCT. 25, 1912.

1,062,969.  Patented May 27, 1913.

Witnesses:
Horace A. Crossman
Carl L. Choate

Inventor:
Henry H Harrison
by Emery, Booth, Janney & Varney
Attys.

UNITED STATES PATENT OFFICE.

HENRY H. HARRISON, OF BOSTON, MASSACHUSETTS.

DRIED FRUIT AND PROCESS OF DRYING THE SAME.

1,062,969. Specification of Letters Patent. Patented May 27, 1913.

Application filed October 25, 1912. Serial No. 727,731.

*To all whom it may concern:*

Be it known that I, HENRY H. HARRISON, a citizen of the United States, and a resident of Boston, county of Suffolk, and Commonwealth of Massachusetts, have invented an Improvement in Dried Fruit and Processes for Drying the Same, of which the following description, in connection with the accompanying drawings, is a specification, like characters on the drawings representing like parts.

My invention relates to the drying of fruit, and particularly to the drying of the cranberry.

Many attempts have been made to dry the cranberry for the purpose of preserving the same but, so far as I am aware, all such attempts prior to my invention have resulted in failure, due to the exceedingly tough and impervious skin which effectually resists the escape of moisture from within the berry and which comprises a very large percentage of the composition of the berry. The berry cannot be dried, of course, unless some escape is provided for this moisture. Failing in attempts to dry the berry as such, considerable success has been had by cutting the berry into parts, thereby to expose the interior thereof to the drying action and for the escape of the contained moisture. But such a process is at best unsatisfactory because it destroys the integrity of the berry, thereby rendering it when subsequently cooked substantially unlike the cooked entire berry, and also because the segregation of the berry into a plurality of parts gives to the product a taste that is substantially unlike that accompanying the use of the entire berry, because of the abnormal exposure of the interior portions of the berry.

In my efforts to devise some means for drying the entire berry I have found that if the tough and impervious skin be suitably vented, as for instance by puncturing it or slitting it at various points, escape is thereby provided for the contained water or moisture, making it possible to dry the berry while still preserving the general and substantial integrity of the same, with the result that when the dried berry is subsequently treated with water or moisture it will reëxpand to assume substantially its original shape and condition and may be then cooked or treated and served as when first grown and before the drying.

My invention, then, comprehends not only a new process by which to dry the cranberry or any other fruit to which the process may be adapted, but a new product as well, which is susceptible of storage and sale like any of the dried fruits, it being capable of preservation for indefinite periods.

In the accompanying drawing, I have illustrated the various steps involved in carrying out one application of my invention, it being understood that my invention is not restricted either to the article of food or to the specific treatment thereof illustrated.

Figure 2:
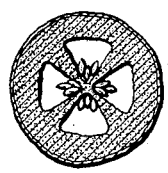
Figure 3:
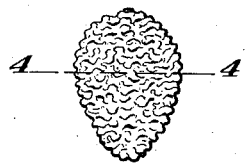
Figure 4:
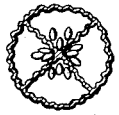
Figure 5:
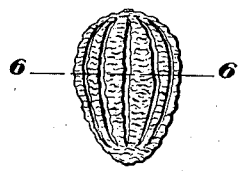
Figure 6:

Referring to the drawing, Figure 1 upon an enlarged scale illustrates a cranberry vented in one manner contemplated by my invention; Fig. 2 is a horizontal cross-section of the berry taken on the dotted line 2—2 of Fig. 1; Fig. 3 illustrates the berry in its dried condition; Fig. 4 is a cross-section of the dried berry taken on the dotted line 4—4 of Fig. 3; Fig. 5 illustrates a modified form of venting; and Fig. 6 is a horizontal section on the dotted line 6—6 of Fig. 5.

In the illustrated use of my invention represented in Figs. 1 to 4 inclusive of the drawing, the entire or whole berry is vented preferably at a plurality of points marked 7 whereby escape is provided for the contained water or moisture. This venting may be accomplished in any desired manner, I having obtained the best results by subjecting the berry to the action of numerous prick points which produce a number of perforations in and through the tough and impervious shell or skin of the berry. This may conveniently be accomplished by running the berries from a hopper between oppositely rotating rolls provided with impaling or puncturing points or projections preferably staggered and which penetrate the skin of the berries at numerous points as they pass between. The puncturing points or projections may be of a length merely sufficient to penetrate the skin or shell at one side of the berry without reaching therethrough to the opposite side, but I have found it convenient and advantageous to make these prick points of a length such that they penetrate for substantial distances into the interiors of the berries, and if desired they may, of course, be such as to extend completely through and puncture the berry from within, at the opposite side thereof.

While puncturing in the manner last mentioned has certain points of advantage, it may be difficult to remove the impaled berries from the puncturing points, and I have found substantial results to be obtained, with greater facility in handling the berries, by employing puncturing points of a length that reach substantially through the interiors of the berries to, but not through the opposite skin faces thereof, and when so used the puncturing points tend to disturb, loosen, open up and prick down the contained contents of the skin to better enable such contents to give up the moisture in drying.

The vented berries may be readily dried in any convenient manner either naturally or artificially, the vents in the skin providing sufficient escape for the contained moisture. When dried, the berry appears much as represented in Fig. 3 of the drawing, with the integrity of the skin preserved substantially throughout, but in a considerably shriveled and contracted condition. When so dried, the berry may be kept indefinitely and may be sold like any dried fruit.

For use, the dried berries are placed in or brought in contact with the required moisture conveniently in the form of a body of water in which they may be immersed, whereupon the berry re-absorbs or takes up moisture which it had previously given up and expands substantially to its original form.

When the vent openings are formed by puncturing the shell from without, the edges of the vent openings are deflected inward in a way that causes the openings to close more or less against expansive action from within, with the result that when the berry is subjected to the action of the moisture for reëxpansion the vent openings might be said to close like valves and to permit the inflation or expansion of the berry to or toward its original shape or form. Whether punctured from without or within, the nature of the article itself is such that when subjected to the action of the moisture for reëxpansion the vent openings tend naturally to close and to preserve the essential characteristics of the contained substance of the berries.

The dried berry resulting from my invention when again used may scarcely be distinguished from the original berry previous to drying and much more nearly resembles the original berry than is possible where the berry is segregated or cut to pieces as has heretofore been considered necessary as a preliminary step to drying.

It is desirable to vent the berry by a multiplicity of perforations since they permit the berry to be more quickly dried than if the ventilation is more restricted.

While I prefer to vent the berry by perforations, as illustrated in Figs. 1 to 4 of the drawing, nevertheless my invention is not restricted to such vent openings. For example, Figs. 5 and 6 illustrate the venting of the berry by slitting its shell or skin, the slits being of any desired length and arrangement; or the venting may be otherwise accomplished according to the taste or ingenuity of the handler thereof so long as the substantial integrity or entirety of the berry is maintained.

What I claim as new and desire to secure by Letters Patent is:

1. As a new article of food, a dried, entire cranberry having a vented skin.

2. As a new article of food, a dried, entire cranberry having a multiplicity of vents distributed in its skin.

3. As a new article of food, a dried, entire fruit having its interior vented through to the outside and disturbed to facilitate the escape of fluid therefrom.

4. The process for drying fruit which comprises venting the interior of the fruit through the outside thereof while retaining the integrity of the fruit and thereafter subjecting the vented fruit to the action of a drying agent.

5. The process for drying fruit which comprises puncturing the enveloping skin or shell thereof from the exterior to produce one or more vents for the interior of the fruit and thereafter subjecting the vented fruit to the action of a drying agent.

6. The process for drying a cranberry which comprises puncturing the enveloping skin or shell thereof from the exterior to the interior of the cranberry to produce one or more vents for the interior thereof, and thereafter subjecting the vented cranberry to the action of a drying agent.

In testimony whereof, I have signed my name to this specification, in the presence of two subscribing witnesses.

HENRY H. HARRISON.

Witnesses:
 ROBERT H. KAMMLER,
 F. IRENE CHANDLER.